(12) United States Patent
Chrestensen et al.

(10) Patent No.: US 8,857,756 B2
(45) Date of Patent: Oct. 14, 2014

(54) ELASTOMERIC BEARING HOUSING AND MATING GRIP FOR HELICOPTER ROTOR SYSTEM

(75) Inventors: George Chrestensen, Arlington, TX (US); Lawrence M. Corso, Keller, TX (US); Daniel Sottiaux, Flower Mound, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 338 days.

(21) Appl. No.: 13/553,317

(22) Filed: Jul. 19, 2012

(65) Prior Publication Data
US 2014/0021290 A1 Jan. 23, 2014

(51) Int. Cl.
*B64C 27/35* (2006.01)
*B64C 27/00* (2006.01)

(52) U.S. Cl.
USPC ........................ 244/17.11; 244/38; 416/134 A

(58) Field of Classification Search
USPC .......... 244/38, 17.17, 17.11; 416/107, 134 R, 416/134 A, 140
See application file for complete search history.

(56) References Cited

U.S. PATENT DOCUMENTS

| | | | | |
|---|---|---|---|---|
| 3,106,965 | A | * | 10/1963 | Gorndt et al. ............. 416/134 A |
| 3,200,887 | A | * | 8/1965 | Ballauer ................... 416/134 A |
| 3,297,094 | A | * | 1/1967 | Kisovec ................... 416/134 A |
| 3,556,673 | A | | 1/1971 | Kilian |
| 4,257,739 | A | * | 3/1981 | Covington et al. ........... 416/140 |
| 4,407,633 | A | | 10/1983 | Mouille |
| 4,549,851 | A | | 10/1985 | Pariani |
| 5,588,801 | A | | 12/1996 | Commelin et al. |
| 5,716,193 | A | | 2/1998 | Mondet et al. |
| 6,200,097 | B1 | | 3/2001 | Mouille |

OTHER PUBLICATIONS

European Search Report in related European Application No. 12190618.4, dated Feb. 13, 2013, 8 pages.

* cited by examiner

*Primary Examiner* — Tien Dinh
*Assistant Examiner* — Richard R Green

(57) ABSTRACT

According to one embodiment, a helicopter rotor system has a bearing disposed between the drive train and the rotor blade. The bearing comprises an elastomeric material, a housing member coupled to the elastomeric material, and an anti-rotation member coupled to the housing member opposite the elastomeric material. A bearing mount is coupled to the grip and comprises a first opening configured to receive the anti-rotation member of the bearing. The first opening is defined at least in part by a first surface that receives the anti-rotation member and prevents the anti-rotation member from completing a rotation within the first opening.

17 Claims, 4 Drawing Sheets

US 8,857,756 B2

ELASTOMERIC BEARING HOUSING AND MATING GRIP FOR HELICOPTER ROTOR SYSTEM

TECHNICAL FIELD

This invention relates generally to helicopter rotor systems, and more particularly, to an elastomeric bearing housing and a mating grip for a rotor system.

BACKGROUND

A helicopter may include one or more rotor systems. One example of a helicopter rotor system is a main rotor system. A main rotor system may generate aerodynamic lift to support the weight of the helicopter in flight and thrust to counteract aerodynamic drag and move the helicopter in forward flight. Another example of a helicopter rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades.

SUMMARY

According to one embodiment, a helicopter rotor system has a bearing disposed between the drive train and the rotor blade. The bearing comprises an elastomeric material, a housing member coupled to the elastomeric material, and an anti-rotation member coupled to the housing member opposite the elastomeric material. A bearing mount is coupled to the grip and comprises a first opening configured to receive the anti-rotation member of the bearing. The first opening is defined at least in part by a first surface that receives the anti-rotation member and prevents the anti-rotation member from completing a rotation within the first opening.

Particular embodiments of the present disclosure may provide one or more technical advantages. A technical advantage of one embodiment may include the capability to prevent rotation of a bearing against a bearing mount in the grip of a helicopter rotor system. A technical advantage of one embodiment may also include the capability to reduce the size and weight of a centrifugal force bearing in a helicopter rotor system. A technical advantage of one embodiment may also include the capability to reduce the size and number of attachment members used to attach a bearing to a bearing mount in the grip of a helicopter rotor system.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
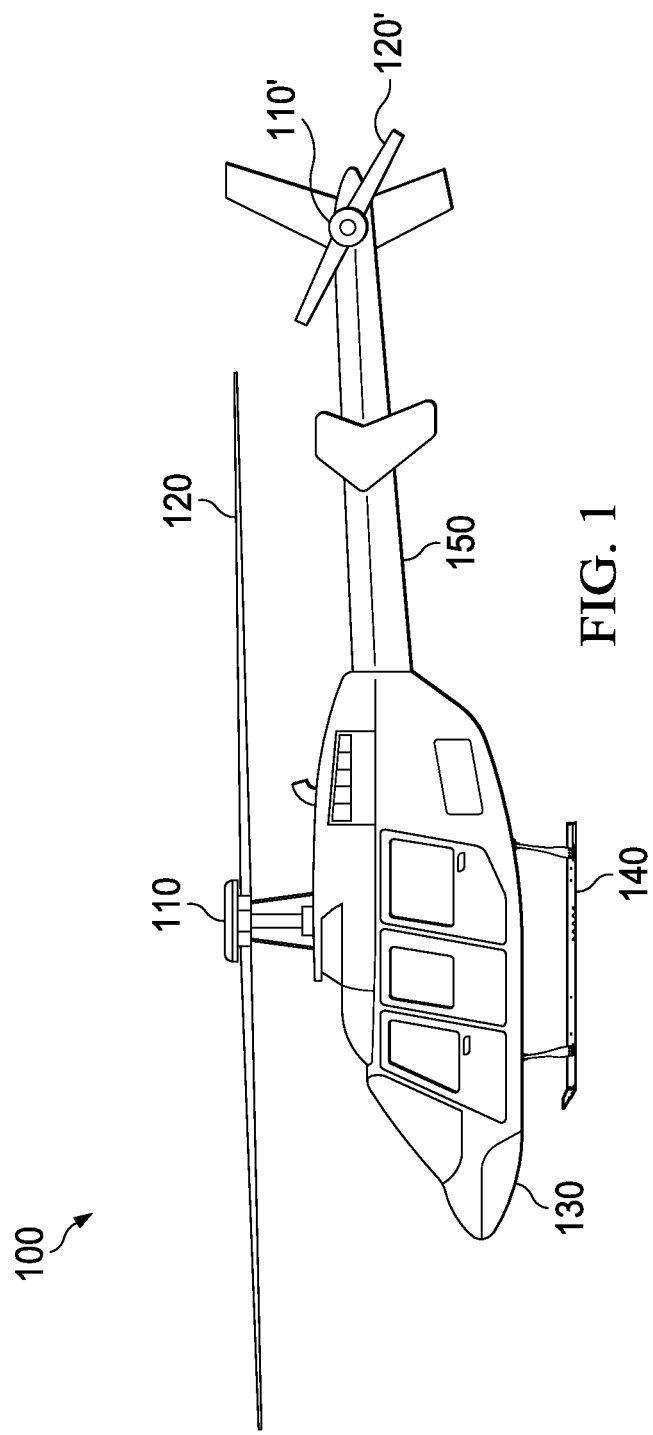
FIG. 1 shows a helicopter according to one example embodiment.

FIG. 1 shows a helicopter 100 according to one example embodiment. Helicopter 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of helicopter 100. Fuselage 130 represents the body of helicopter 100 and may be coupled to rotor system 110 such that rotor system 110 and blades 120 may move fuselage 130 through the air. Landing gear 140 supports helicopter 100 when helicopter 100 is landing and/or when helicopter 100 is at rest on the ground. Empennage 150 represents the tail section of the aircraft and features a rotor system 110' and blades 120'. Rotor system 110' and blades 120' may collectively provide thrust in the same direction as the rotation of blades 120 so as to counter the torque effect created by rotor system 110 and blades 120. Teachings of certain embodiments relating to rotor systems described herein may apply to rotor system 110, rotor system 110', and/or other rotor systems, including but not limited to non-helicopter rotor systems.

Figure 2:
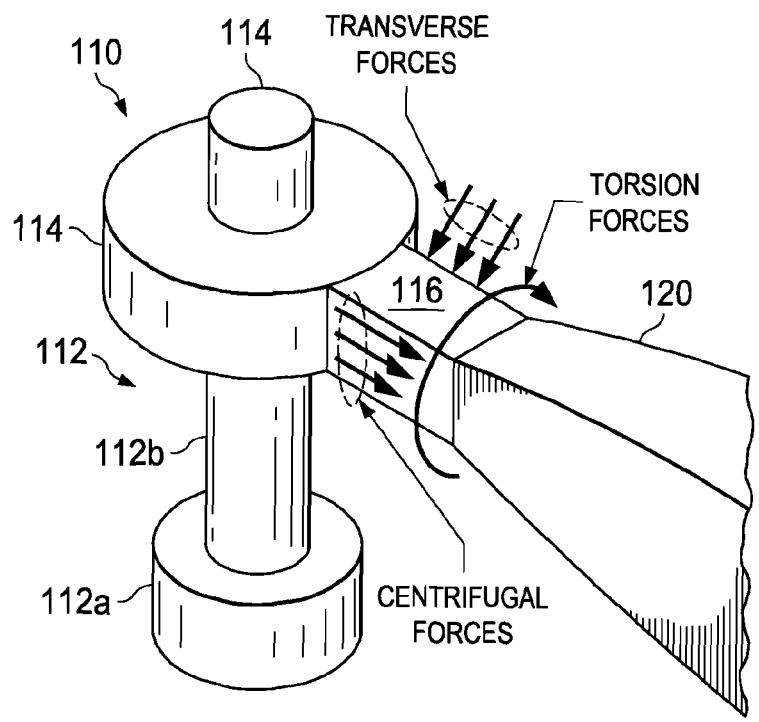
FIG. 2 shows a cross-section view of the rotor system and a blade of the helicopter of FIG. 1 according to one example embodiment.

FIG. 2 shows rotor system 110 and a blade 120 according to one example embodiment. In the example of FIG. 2, rotor system 110 features a drive train 112, a yoke 114, and a grip 116. Drive train 112 features a power source 112a and a drive shaft 112b. In some examples, rotor system 110 may include more or fewer components. For example, FIG. 2 does not show components such as a gearbox, a swash plate, drive links, drive levers, and other components that may be incorporated.

Power source 112a, drive shaft 112b, yoke 114, and grip 116 are mechanical components for generating and transmitting torque and rotation. Drive train 112 may include a variety of components, including an engine, a transmission, and differentials. In operation, drive shaft 112b receives torque or rotational energy from power source 112a and rotates yoke 114. Blades 120 are coupled to yoke 114 by grips 116. Rotation of yoke 114 causes grips 116 and blades 120 to rotate about drive shaft 112b.

As will be explained in greater detail below, grips 116 and blades 120 may be subject to a variety of different forces. For example, rotation of grips 116 and blades 120 may result in a centrifugal force against grips 116 and blades 120 in a direction away from drive shaft 112b. As another example, blades 120 may transfer torsion forces to grips 116. As yet another example, the weight of grip 116 and blade 120 may result in a transverse force being applied against grip 116.

Figure 3:
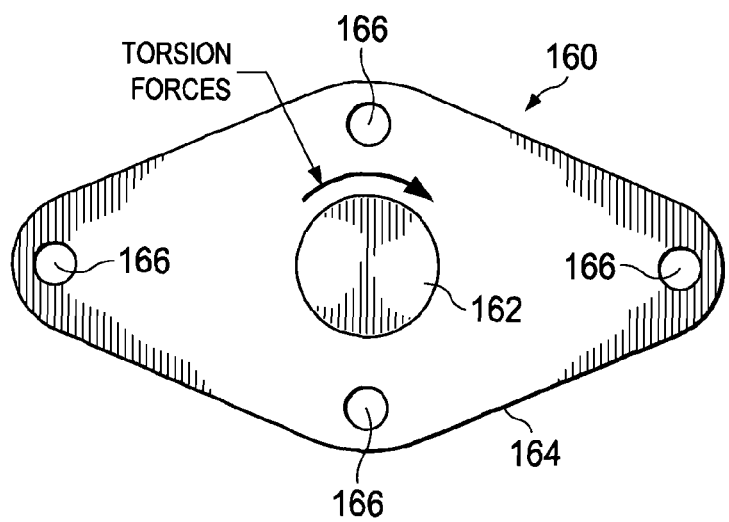
FIG. 3 shows a bearing that may protect the rotor system of FIG. 2 against centrifugal forces.

Bearings may be provided to protect components of rotor system 110 against centrifugal and transverse forces. For example, FIG. 3 shows a bearing 160 that may be coupled to grip 116 for protecting against centrifugal forces. Bearing 160 features elastomeric material 162 coupled to a bearing housing member 164.

Elastomeric material 162 may include any material, such as a polymer, that has the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Elastomeric materials may absorb energy during compression but may also be prone failure during tension and torsion.

Bearing housing member 164 provides a surface for supporting elastomeric material 162. In one example, bearing housing member 164 is formed from a metallic material such as titanium. Bearing housing member 164 includes mounting locations 166 for mounting bearing housing member to grip 116. In some scenarios, bearing housing member 164 may be mounted at mounting locations 166 using bolts, screws, or other devices.

Typically, bearing housing member 164 would include at least two mounting locations 166. Mounting devices may be placed at mounting locations 166 to secure bearing housing member 164 to grip 116. In the example of FIG. 3, bearing housing member 164 includes four mounting locations 166. By having at least two mounting locations 166, mounting devices at mounting locations 166 may also prevent bearing housing member 164 from rotating relative to grip 116 in addition to securing bearing housing member 164 to grip 116. For example, bearing housing member 164 may be subject to torsion forces from blade 120, and mounting devices at mounting locations 166 may be subject to shear forces as a result of the torsion forces. For example, in FIG. 3, each mounting location 166 as a distance from the center of bearing housing member 164, and torsion forces on bearing housing member 164 may transfer shear forces to the mounting devices at mounting locations 116.

In the example of FIG. 3, grip 116, bearing housing member 164, mounting locations 166, and the mounting devices may be sized to withstand the torsion forces. For example, if the diameter of each mounting device is too small, the mounting devices might fracture and cause bearing housing member 164 to detach from grip 116. Thus, the diameter of the mounting devices may be larger to accommodate the torsion forces, mounting locations 166 may also be larger to accommodate larger mounting devices, and grip 116 and bearing housing member 164 may be thicker in order to distribute forces appropriately. Thus, the overall size and weight of bearing 160 may be larger to accommodate the torsion forces.

Teachings of certain embodiments recognize the capability to reduce the overall size and weight of bearing 160. In particular, teachings of certain embodiments recognize the capability to reduce or even eliminate the shear forces on an attachment member. In some embodiments, shear forces on an attachment member may be reduced by only providing a single attachment member at the center of the bearing housing member and by providing an anti-rotation member separate from the attachment member to carry the torsion forces.

Figure 4A:
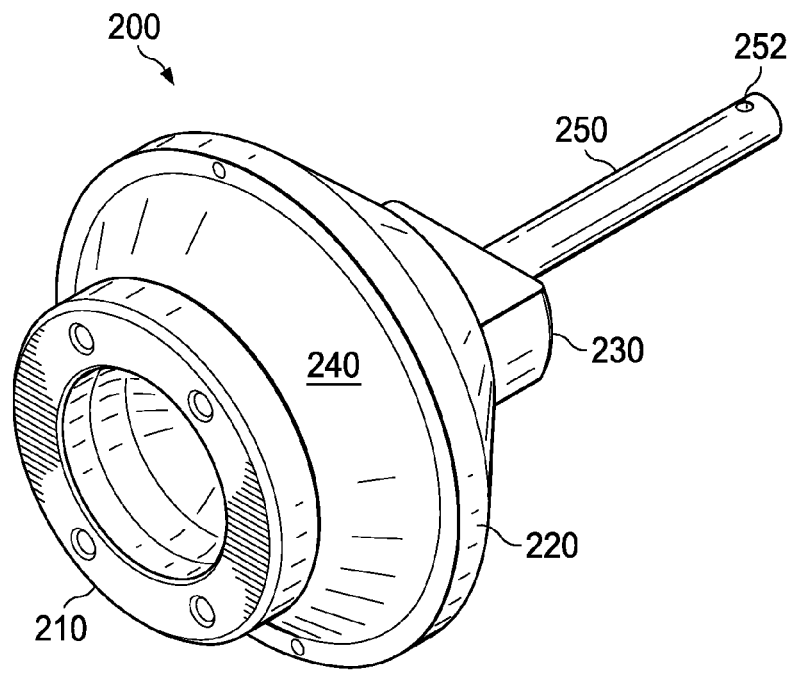
FIG. 4A shows a bearing according to one example embodiment that may protect the rotor system of FIG. 2 against centrifugal forces.
Figure 4B:
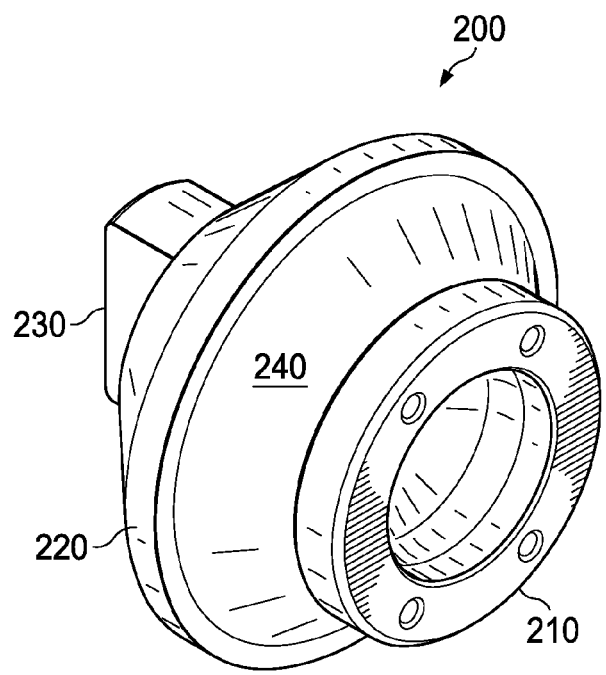
FIG. 4B shows the bearing of FIG. 4A with the attachment member removed according to one example embodiment.

FIGS. 4A and 4B shows a bearing 200 according to one example embodiment. Bearing 200 features an outer housing member 210, an inner housing member 220, an anti-rotation member 230, elastomeric material 240, and a single attachment member 250. FIG. 4A shows bearing 200 with single attachment member 250, and FIG. 4B shows bearing 200 with single attachment member 250 removed from anti-rotation member 230. In operation, anti-rotation member 230 may reduce shear forces on single attachment member 250 by carrying the torsion forces.

Outer housing member 210, inner housing member 220, and anti-rotation member 230 may support elastomeric material 240. Elastomeric material 240 may include any elastic material, such as materials described with regard to elastomeric material 162 shown in FIG. 3. Outer housing member 210, inner housing member 220, and anti-rotation member 230 may be constructed from a common material or different materials. For example, in one embodiment, inner housing member 220 and anti-rotation member 230 are constructed as one part. In some embodiments, outer housing member 210, inner housing member 220, and anti-rotation member 230 are formed from a metallic material such as titanium. Anti-rotation member 230 is described in greater detail with regard to FIGS. 5A and 5B.

Single attachment member 250 allows bearing 200 to be attached to another device, such as grip 116 or a bearing mount coupled to grip 116. Single attachment member 250 is coupled to anti-rotation member 230. In some embodiments, single attachment member 250 and anti-rotation member 230 are permanently coupled. For example, in one embodiment, anti-rotation member 230 and single attachment member 250 are constructed as the same part, as shown in FIG. 4A. In other embodiments, single attachment member 250 is removably coupled with anti-rotation member 230. For example, in some embodiments, single attachment member 250 may thread into an opening within anti-rotation member 230. FIG. 4B shows bearing 200 with single attachment member 250 removed. Single attachment member 250 is described in greater detail with regard to FIGS. 5A and 5B.

In some embodiments, single attachment 250 may feature an attachment mechanism 252 opposite anti-rotation member 230 that couples bearing 200 to grip 116. In the example of FIG. 4A, attachment mechanism 252 is a locking pin that may be inserted after single attachment member 250 slides into an opening in a bearing mount. Attachment mechanism 252 will be described in greater detail with regard to FIGS. 5A and 5B.

Figure 5A:
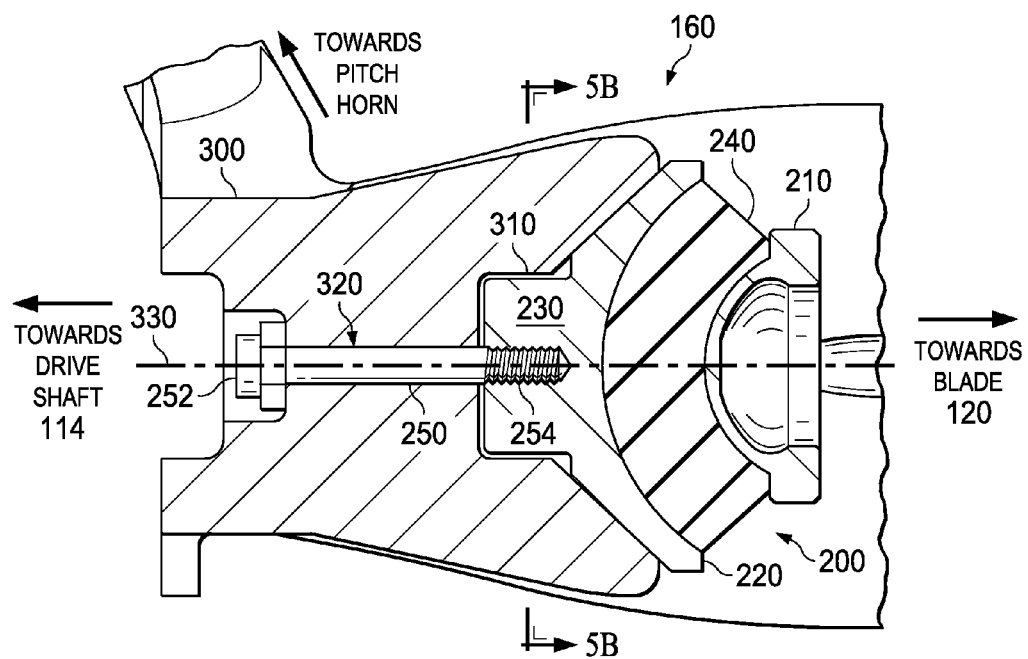
FIGS. 5A and 5B show cross-section views of the bearing of FIG. 4B installed in the rotor system of FIG. 2 according to one example embodiment.
Figure 5B:
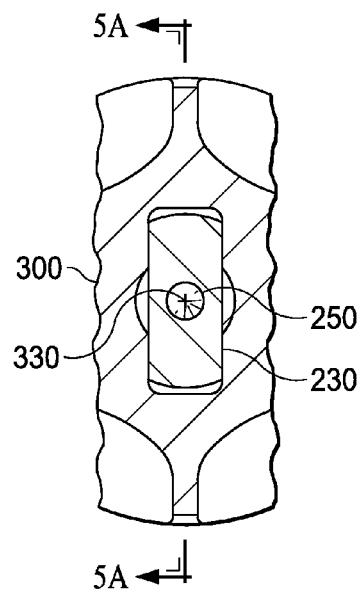

FIGS. 5A and 5B show bearing 200 of FIG. 4B installed in a bearing mount 300. FIG. 5A shows a cross-section of bearing 200 and bearing mount 300 along the line indicated in FIG. 5B, and FIG. 5B shows a cross-section of bearing 200 and bearing mount 300 along the line indicated in FIG. 5A. Bearing mount 300 is coupled to grip 160. Bearing mount 300 features an anti-rotation opening 310 and an attachment opening 320. In operation, anti-rotation opening 310 receives anti-rotation member 230, and attachment opening 320 receives attachment member 250.

Anti-rotation opening 310 and anti-rotation member 230 are configured such that the surface of anti-rotation opening 310 contacts the surface of anti-rotation member 230 and prevents anti-rotation member 230 from rotating within anti-rotation opening 310 when anti-rotation opening 310 receives anti-rotation member 230. In the example of FIGS. 5A and 5B, anti-rotation opening 310 and anti-rotation member 230 have approximately planar surfaces that contact one another and prevent anti-rotation member 230 from rotating. In the example of FIG. 5B, anti-rotation opening 310 and anti-rotation member 230 each have two opposite planar surfaces, and each planar surfaces contacts an opposing planar surface and prevents rotation. In some embodiments, anti-rotation opening 310 and anti-rotation member 230 may have different shapes, such as more complicated patterns, that interlock and prevent anti-rotation member 230 from rotating.

As explained above, anti-rotation member 230 may reduce shear forces on single attachment member 250 by carrying the torsion forces. Teachings of certain embodiments recognize that shear forces on an attachment member may be reduced by locating the attachment member near the center of bearing 200. In the example of FIG. 5A, attachment member 250 is oriented along axis 330. Axis 330 extends through the approximate center of bearing 200, as shown in FIG. 5A. In the example of FIG. 5A, outer member 210, inner member 220, anti-rotation member 230, elastomeric material 240, single attachment member 250, bearing 300, opening 310, and opening 320 are all coaxial, as a single line (e.g., axis 330) may also be drawn through each of these features. In one example embodiment, axis 330 intersects a geometric center of each of these features.

Teachings of certain embodiments also recognize that shear forces may be reduced by providing only one attachment member. Bearing 200, for example, only includes single attachment member 250. Teachings of certain embodiments recognize that additional attachment members would necessarily be located further from the center of bearing 200 and therefore may be subject to greater shear forces as a result of the torsion forces on bearing 200.

As explained above, bearing 200 features an attachment mechanism 252. FIG. 4A, for example, features a locking pin that may be inserted after single attachment member 250 is inserted into opening 320 of bearing mount 300. In this example, the locking pin may prevent single attachment member 250 from backing out of opening 320.

FIG. 5A shows single attachment member 250 and attachment mechanism 252 according to an alternative embodiment. In FIG. 5A, single attachment member 250 threads into anti-rotation member 230 along thread 254. In this example, attachment mechanism 252 is represented by a bolt head that presses against bearing mount 300 when single attachment mechanism 300 threads into anti-rotation member 230.

In operation, according to one example embodiment, bearing 200 is coupled to bearing mount 300. In particular, anti-rotation opening 310 receives anti-rotation member 230, and attachment opening 320 receives single attachment member 250. Bearing 200 is secured to bearing mount 300 via attachment mechanism 252. Anti-rotation member 230 is maintained in anti-rotation opening 310 and single attachment member 250 is maintained in attachment opening 320 during operation of helicopter 100. As the rotation speed of blades 120 increases, rotor system 110 may be subjected to a centrifugal force such that elastomeric material 240 compresses. In addition, rotor system 110 may be subjected to a rotational force such that a surface of anti-rotation member 230 contacts a surface of anti-rotation opening 310 such that anti-rotation opening 310 prevents anti-rotation member 230 from completing a rotation within anti-rotation opening 310.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A helicopter, comprising:
   a fuselage;
   a drive train coupled to the fuselage;
   a yoke coupled to the drive train;
   a grip coupled to the yoke;
   a rotor blade coupled to the grip;
   a bearing disposed between the drive train and the rotor blade, the bearing comprising:
     an elastomeric material;
     a housing member coupled to the elastomeric material; and
     an anti-rotation member coupled to the housing member opposite the elastomeric material;
   a bearing mount coupled to the grip and comprising a first opening configured to receive the anti-rotation member of the bearing, wherein the first opening is defined at least in part by a first surface configured to contact a corresponding surface of the anti-rotation member when the first opening of the bearing mount receives the anti-rotation member of the bearing such that the first surface prevents the anti-rotation member from completing a rotation within the first opening; and
   an attachment member coupled to the bearing and comprising an elongated shaft aligned along an axis that intersects the anti-rotation member and at least some of the elastomeric material;
   wherein the bearing mount further comprises a second opening defining a passageway through the bearing mount, and
   wherein the attachment member is coupled to the anti-rotation member and configured to pass through the passageway of the bearing mount when the first opening of the bearing mount receives the anti-rotation member of the bearing.

2. The helicopter of claim 1, wherein the attachment member is removably coupled to the anti-rotation member.

3. The helicopter of claim 1, wherein the attachment member is removably coupled to the bearing mount opposite the bearing.

4. The helicopter of claim 1, wherein the elastomeric material, the housing member, the anti-rotational member, the bearing mount, and the attachment member are coaxial.

5. The helicopter of claim 1, wherein the attachment member is the only mechanism for coupling the bearing to the bearing mount.

6. The helicopter of claim 1, wherein the first opening is defined at least in part by a second surface opposite the first surface, the second surface being configured to contact a second corresponding surface of the anti-rotation member when the first opening of the bearing mount receives the anti-rotation member of the bearing such that the first surface and the second surface prevent the anti-rotation member from completing a rotation within the first opening.

7. The helicopter of claim 1, wherein the elastomeric material, the housing member, the anti-rotational member, and the bearing mount are coaxial.

8. The helicopter of claim 1, further comprising a second housing member coupled to the elastomeric material opposite the housing member.

9. A method for preventing rotation of a rotor bearing, the rotor bearing comprising an elastomeric material, a housing member coupled to the elastomeric material, an anti-rotation member coupled to the housing member opposite the elastomeric material, and an attachment member coupled to the bearing and comprising an elongated shaft aligned along an axis that intersects the anti-rotation member and at least some of the elastomeric material, the method comprising:
   maintaining the anti-rotation member of the rotor bearing in a first opening of a bearing mount, wherein the first opening is defined at least in part by a first surface that contacts a corresponding surface of the anti-rotation member;

subjecting the rotor system to a centrifugal force such that the elastomeric material compresses; and subjecting the bearing to a rotational force such that the corresponding surface of the anti-rotation member contacts the first surface and the first surface prevents the anti-rotation member from completing a rotation within the first opening;

wherein the bearing mount further comprises a second opening defining a passageway through the bearing mount, wherein the attachment member is coupled to the anti-rotation member, the method further comprising:

passing the attachment member through the passageway of the bearing mount; and coupling an end of the attachment bar opposite the anti-rotation member to the bearing mount.

10. The method of claim 9, wherein the attachment member is the only mechanism for coupling the bearing to the bearing mount.

11. The method of claim 9, the bearing further comprising a second housing member coupled to the elastomeric material opposite the housing member.

12. A helicopter rotor bearing, comprising:
an elastomeric material;
a housing member coupled to the elastomeric material;
an anti-rotation member coupled to the housing member opposite the elastomeric material, the anti-rotation member comprising an anti-rotation surface configured to contact a first surface of an opening of a bearing mount when the first opening of the bearing mount receives the anti-rotation member of the bearing such that the anti-rotation surface prevents the anti-rotation member from completing a rotation within the first opening; and an attachment member coupled to the bearing and comprising an elongated shaft aligned along an axis that intersects the anti-rotation member and at least some of the elastomeric material;

wherein the bearing mount further comprises a second opening defining a passageway through the bearing mount, and wherein the attachment member is coupled to the anti-rotation member and configured to pass through the passageway of the bearing mount when the first opening of the bearing mount receives the anti-rotation member of the bearing.

13. The helicopter rotor bearing of claim 12, further comprising a second housing member coupled to the elastomeric material opposite the housing member.

14. The helicopter rotor bearing of claim 12, wherein the attachment member is removably coupled to the anti-rotation member.

15. The helicopter rotor bearing of claim 12, the attachment member comprising a coupling mechanism opposite the anti-rotation member, the coupling mechanism operable to removably couple the attachment member to the bearing mount.

16. The helicopter rotor bearing of claim 12, wherein the elastomeric material, the housing member, the anti-rotational member, the bearing mount, and the attachment member are coaxial.

17. The helicopter rotor bearing of claim 12, wherein the attachment member is the only mechanism for coupling the bearing to the bearing mount.

* * * * *